United States Patent Office 3,801,707
Patented Apr. 2, 1974

3,801,707
THERMAL STABILITY OF ALUMINUM HYDRIDE THROUGH USE OF STABILIZERS
Alan E. Ardis, North Haven, and Frank S. Natoli, Hamden, Conn., assignors to the United States of America as represented by the Secretary of the Army
No Drawing. Filed Apr. 9, 1969, Ser. No. 815,527
Int. Cl. C01b 6/00
U.S. Cl. 423—645          10 Claims

ABSTRACT OF THE DISCLOSURE

Free radical acceptor stabilizers such as 2-mercaptobenzothiazole and phenothiazine when introduced into an aluminum hydride synthetic process have been found effective in improving the thermal stability of the final aluminum hydride product.

BACKGROUND OF THE INVENTION

This invention relates to the use of free radical acceptor stabilizers to improve the thermal stability of aluminum hydride(58). (The various forms of unsolvated aluminum hydride are named according to the maximum absorption in the infrared; e.g., aluminum hydride(58) absorbs strongest at 5.8 microns.)

Aluminum hydride is useful as a propellant ingredient and has been found to exist in several different crystal forms (polymorphs). When a solution of aluminum hydride in ether, which can be obtained by any of the standard synthetic processes (such as those referred to hereinafter) for obtaining aluminum hydride, is evaporated to dryness at a temperature not exceeding 50° C., a solid etherated aluminum hydride is obtained, which is designated as aluminum hydride(62). When this material is heated at 65–75° C. under vacuum, it splits off ether and yields aluminum hydride(60), a desolvated product. The aluminum hydride(60) can then be heated further below 100° C. to yield aluminum hydride(58), a stable crystalline form of unsolvated aluminum hydride. If the etherated aluminum hydride(62) is heated under certain specific conditions it will yield aluminum hydride(57), another crystalline form of unsolvated aluminum hydride but one whose stability is not as good as that of aluminum hydride(58), which is the most stable unsolvated form of aluminum hydride. It has been definitely established that aluminum hydride(58) is the preferred form of final unsolvated aluminum hydride for propellant application. It is with this form of aluminum hydride that this invention is concerned.

The various forms of aluminum hydride, including aluminum hydride(58), tend to be thermally unstable.

Accordingly, it is the principal object of this invention to improve the thermal stability of aluminum hydride(58).

It is a particular object of this invention to improve the thermal stability of aluminum hydride(58) by means of a novel stabilizer additive.

SUMMARY OF THE INVENTION

It has been discovered that free radical acceptor stabilizers such as 2-mercaptobenzothiazole and phenothiazine when introduced into an aluminum hydride synthetic process are effective in improving the thermal stability of the final aluminum hydride(58).

DESCRIPTION OF THE PREFERRED EMBODIMENTS

Aluminum hydride can be prepared by the standard LiAlH$_4$—HCl process. This process is illustrated by the equation:

$$LiAlH_4 + HCl \xrightarrow{ether} AlH_3 + LiCl\downarrow + H_2\uparrow$$

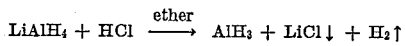

It features the use of LiAlH$_4$ in excess of the HCl and high dilution with ether. The insoluble lithium chloride is removed by filtration and the aluminum hydride is isolated by evaporation to dryness of the filtrate (e.g., distillation under atmospheric pressure). Alternatively, evaporation with a nitrogen sweep may be employed.

A second process involves the reaction of LiAlH$_4$ with AlCl$_3$:

$$3LiAlH_4 + AlCl_3 \xrightarrow{ether} 4AlH_3 + 3LiCl\downarrow$$

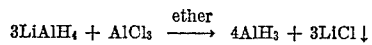

It employs an excess of LiAlH$_4$ and a small quantity of LiBH$_4$ in the reaction mixture. The mechanism by which these agents behave, either independently or in conjunction with one another, in the desolvation, conversion and crystallization processes, has not been fully elucidated. It can be postulated that they function in a number of diverse ways such as aids for solubilization of aluminum hydride and/or ether removal, or they may possibly behave as nucleating agents, chain length terminating groups and/or crystal growth controllers.

Aromatic solvents, such as benzene, toluene, or xylene, in contrast to aliphatics, are found to be effective for retaining aluminum hydride in ethereal solution prior to crystallization, thus promoting the growth of aluminum hydride(58).

The use of ethers other than diethyl has been explored for these syntheses. With the exception of allyl ether, all appear to be quite similar, varying somewhat because of basicity and steric factors.

With the use of various ratios of ether to aromatic hydrocarbon, two methods have been investigated and developed for desolvating, converting and crystallizing aluminum hydride(58) through the last synthesis. These are the vacuum-atmospheric and atmospheric processes.

A number of variables, including additive ratios, distillation rates, temperatures, crystallization promoters and stirring rates have been investigated for each process.

A third process involves the reaction of NaAlH$_4$ with AlCl$_3$:

$$3NaAlH_4 + AlCl_3 \xrightarrow{LiAlH_4} 4AlH_3 + 3NaCl$$

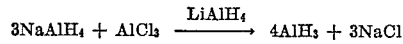

For details of this process, see U.S. patent application Ser. No. 234,576, filed Oct. 23, 1962.

Generally speaking, the process for synthesizing AlH$_3$ involves reacting a first compound having an [AlH$_4$] or [BH$_4$] cation with a second compound which can be HCl, or AlCl$_3$. Note: One of the combinations selected must contain aluminum.

However, other processes for synthesizing AlH$_3$ exist which do not fall into the above general category. The process of this invention may be employed with almost any process for synthesizing alumina hydride(58).

In an attempt to solve the problem of the thermal instability of aluminum hydride produced by various processes, experimental studies were begun.

These studies of various AlH$_3$ samples in air provided an initial clue to the decomposition of the AlH$_3$ when it was shown that oxygen did not affect the undissociated AlH$_3$, but reacted only with the active intermediates obtained from the initiation of the thermal decomposition. A free radical mechanism was accordingly postulated for this decomposition in which oxygen acted as an inhibiter at the propagation stages.

Accordingly, free radical acceptor stabilizers were employed in synthetic processes for preparing aluminum anhydride. The following process for preparing aluminum hydride with increased thermal stability is concerned with use of a free radical acceptor as the means to achieve a more stabilized product.

A 0.5 molar AlH$_3$-ether solution is prepared by the addition of 193.2 ml. of 1.10 molar LiAlH in ether to 63.5 ml. of 0.99 molar AlCl₃. An additional volume of 198 ml. of dry ether and 47.6 ml. of 0.95 molar LiBH₄-ether solution is added to this solution so that it contains 10 and 18 percent excesses of LiAlH₄ and LiBH₄, respectively. Two volumes (1 liter) of toluene are next added and the mixture is filtered. To the clear filtrate is then added 10 ml. of a saturated solution of mercaptobenzothiazole in toluene (0.1 g. of additive). The following heating profile was employed to accomplish the desolvation and conversion stages (the preparation of aluminum anhydride(58) involves 4 basic steps; namely, reaction, desolvation, conversion and crystallization):

| Time (minutes) | Bath temp. (° C.) | Pot temp. (° C.) | Vacuum (mm. Hg) |
| --- | --- | --- | --- |
| 0 | 62 | 40 | 470 |
| 15 | 62 | 45 | 490 |
| 30 | 60 | 49 | 500 |
| 60 (ppt.) | 60 | 51 | 565 |
| 75 | 60 | 49 | 605 |
| 90 | 60 | 50 | 615 |
| | Vacuum released; heating begun | | |
| 105 | 95 | 75 | Atm. |
| 117 | 115 | 97 | Atm. |
| 145 | 110 | 100 | Atm. |
| | Solutions cooled | | |

The mixture is filtered and the resulting solids are washed with ether to remove excess LiAlH₄ and LiBH₄. Final drying is accomplished under vacuum. The resulting product, aluminum anhydride (58), is next tested for thermal stability by means of a standard Taliani test at 60° C. Typical results are as follows:

TALIANI DECOMPOSITION

| Percent | Hours | Percent | Hours | Percent | Hours |
| --- | --- | --- | --- | --- | --- |
| 0.04 | 72 | 0.20 | 306 | 1.34 | 477 |
| 0.07 | 168 | 0.60 | 409 | | |

The following data illustrates the stability achieved by means of 2-mercaptobenzothiazole (MBT) as compared with a "standard" of Olane 58 without (MBT) added:

THERMAL DECOMPOSITIONS (TALIANI)

| Reference | Percent decomposition |
| --- | --- |
| Standard | 0.26% (102 hrs.) 0.47% (142 hrs.) 7.5% (338 hrs.) |
| Olane 58 with MBT added. | 0.09% (95 hrs.) 0.41% (143 hrs.) 0.6% (409 hrs.) |

Another decomposition test (Taliani, 60° C.), wherein Olane 58 was stabilized by phenothiazine (PTA), was continued for 27 days; only 0.97 percent decomposition was observed in the stabilized Olane 58.

The achievement of a 10–20 fold improvement in thermal stability over that of a "standard" aluminum hydride (58) sample (without additives) is attainable with aluminum hydride(58) with the additives, MBT or PTA. All experimental solutions were 0.5 molar in aluminum hydride and contained 1500 ml. of toluene-ether (2:1), 10 mole percent excess LiAlH₄, and 18 mole percent excess LiBH₄. The additives present in amounts from 10 mg. to 100 mg. achieves the disclosed typical improvements in stability.

The stabilizer, either 2-mercaptobenzothiazole or phenothiazine, can be added at or prior to the conversion temperature (90–95° C.), in either the above vacuum-atmospheric process, or in the atmospheric process (in which later process the desolution of aluminum hydride (62) and its subsequent conversion to aluminum hydride (58) are conducted under atmospheric pressures), with equal effect.

In general, the stabilizer may be added in any process for the synthesis of aluminum hydride, after, during or prior to the reaction step, but prior to or during the conversion step to aluminum hydride(58).

Studies have indicated that introduction of the stabilizer during the reaction step is detrimental to the overall crystallization process. Later addition, prior to 90° C. or during conversion of the aluminum hydride(60) at 95° C., results in macrocrystalline aluminum hydride(58) of superior thermal stability. The introduction of stabilizer at this point probably minimizes any interference with the overall crystallization process. In particular, the addition of 0.20 g. of the stabilizer at the synthesis stage may result in the formation of little or no aluminum hydride (58). The introduction of the stabilizer prior to or during conversion achieved a 10–20 fold improvement in thermal stability over that of a "standard" aluminum hydride (58) sample.

The deposition of the stabilizer additive by after-treatment on the final aluminum hydride(58) product is generally unsatisfactory, although some improvement in the thermal stability of "off-grade" samples of aluminum hydride has been obtained by such after-treatment.

It must be emphasized that the treatment of the aluminum hydride must occur in solution prior to or during its conversion and prior to its crystallization. Once the aluminum hydride has been crystallized, it cannot be redissolved under the present state of the art.

Several mechanisms can be postulated for the stabilization of AlH₃ by a free radical inhibitor used as a stabilizer. The simplest involves the following interactions (shown for 2-mercaptobenzothiazole):

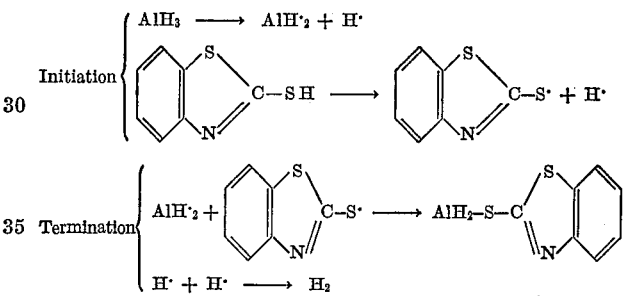

The mercaptobenzothiazole radical may also dimerize to the disulfide.

Work with other free radical acceptor inhibitors such as sulfur or hydroquinone has also been done. Hydroquinone produces a substantial improvement in stability but is not as effective as the two stabilizers previously mentioned. The use of sulfur offers no improvement over the unstabilized standard aluminum hydride sample.

The time requirements for the previously described polymorph conversions are largely a matter of heat-transfer characteristics of the system, closely related to batch size, geometry of system, particle size, and efficiency of ether removal. The particular size and shape of the final aluminum hydride(58), of course, are largely dependent on the solvent characteristics of the crystallizing medium.

The aluminum hydride(58) (which has been treated with the stabilizer) is used as the fuel component in a propellant composition. Various oxidizers may be used therewith. A typical oxidizer is an inorganic oxidizing salt such as ammonium perchlorate or ammonium nitrate. The preferred oxidizer, however, is hydrazinium nitrate. Similarly, various binders may be used therewith. The preferred binder is polyethylene.

We claim:
1. The process of converting a solid unsolvated aluminum hydride having maximum infrared absorption characteristics at 6.0 microns to a stable, crystalline unsolvated aluminum hydride that exhibits maximum infrared absorption characteristics at 5.8 microns, said process comprising heating a solution of said unsolvated aluminum hydride in which a small amount of a stabilizer is present, said stabilizer being selected from the group consisting of 2-mercaptobenzothiazole, phenothiazine or hydroquinone, said stabilizer being added to said solution prior to said converting.

2. The process of claim 1 wherein said stabilizer is said 2-mercaptobenzothiazole.

3. The process of claim 1 wherein said stabilizer is said phenothiazine.

4. The process of claim 1 wherein said solution contains toluene and either.

5. The process of claim 4 wherein said stabilizer in said 2-mercaptobenzothiazole.

6. The process of claim 4 wherein said stabilizer in said phenothiazine.

7. The process of claim 5 wherein an amount of from about 0.1 to about 0.2 gram of said 2-mercaptobenzothiazole is added per 1.5 liters of said solution.

8. The process of claim 7 wherein said amount is about 0.1 gram.

9. The process of claim 8 wherein said solution is heated to about 95° C.

10. The process of claim 9 wherein said ether is diethyl ether.

References Cited
UNITED STATES PATENTS

| | | | |
|---|---|---|---|
| 3,664,811 | 5/1972 | Scruggs | 423—645 |
| 3,751,566 | 8/1973 | Churchill | 423—645 |
| 2,804,397 | 8/1957 | Goodman | 23—204 X |

OTHER REFERENCES

Finholt et al., J. Am. Chem. Soc., vol. 69, p. 1202, (1947).

CARL D. QUARFORTH, Primary Examiner

P. A. NELSON, Assistant Examiner